United States Patent
Hisanaga et al.

[11] Patent Number: 5,907,556
[45] Date of Patent: May 25, 1999

[54] DATA TRANSMISSION SYSTEM HAVING FEATURE FOR PREDICTING TIME COMPLETION BASED ON CHANGING OF STATES OF USE OF BANDWIDTH AND TIME REQUIRED FOR RETRANSMISSION

[75] Inventors: Takanori Hisanaga; Yuji Kozawa; Yasutoshi Maeda; Katsuya Mitsutake, all of Nakai-machi, Japan

[73] Assignee: Fuji Xerox Co., Ltd., Tokyo, Japan

[21] Appl. No.: 08/838,991

[22] Filed: Apr. 23, 1997

[30] Foreign Application Priority Data

May 30, 1996 [JP] Japan ................................... 8-137240

[51] Int. Cl.⁶ .................................................. H04L 12/00
[52] U.S. Cl. ...................... 370/468; 370/235; 395/200.63
[58] Field of Search ..................... 370/468, 236, 370/235; 371/32, 61; 455/74.1; 395/200.63; 348/12

[56] References Cited

U.S. PATENT DOCUMENTS

| | | | |
|---|---|---|---|
| 4,727,536 | 2/1988 | Reeves et al. | 370/468 |
| 5,020,077 | 5/1991 | Rhodes | 375/222 |
| 5,031,179 | 7/1991 | Yoshida et al. | 371/32 |
| 5,187,707 | 2/1993 | Chu et al. | 370/236 |
| 5,526,399 | 6/1996 | Kameda | 455/74.1 |
| 5,612,966 | 3/1997 | Lee | 371/61 |
| 5,734,825 | 3/1998 | Lauck et al. | 395/200.63 |
| 5,774,455 | 6/1998 | Kawase et al. | 370/232 |
| 5,802,302 | 9/1998 | Waclawsky et al. | 395/200.54 |
| 5,805,203 | 9/1998 | Horton | 348/12 |

FOREIGN PATENT DOCUMENTS

A-8-17949  1/1996  Japan.

*Primary Examiner*—Krisna Lim
*Attorney, Agent, or Firm*—Oliff & Berridge, PLC

[57] ABSTRACT

The present invention provides a data transmission system having a data sending unit, a data receiving unit and a data transmission medium for data transmission from the data sending unit to the data receiving unit, which comprises an element for generating feature information of data transmission from the data sending unit to the data receiving unit in advance of execution of the data transmission, an element for storing change of states of use of a bandwidth by data transmission now under execution, an element for predicting a time of completion of the data transmission now under execution based on the change of states of use of the bandwidth and the feature information of the data transmission now under execution, an element for determining a transmission rate for data transmission to be next executed at the time of completion of the data transmission now under execution based on the change of states of use of the bandwidth and the feature information of the data transmission to be next executed, and an element for executing the data transmission to be next executed from the data sending unit according to the transmission rate at the time of completion of the data transmission now under execution.

5 Claims, 12 Drawing Sheets

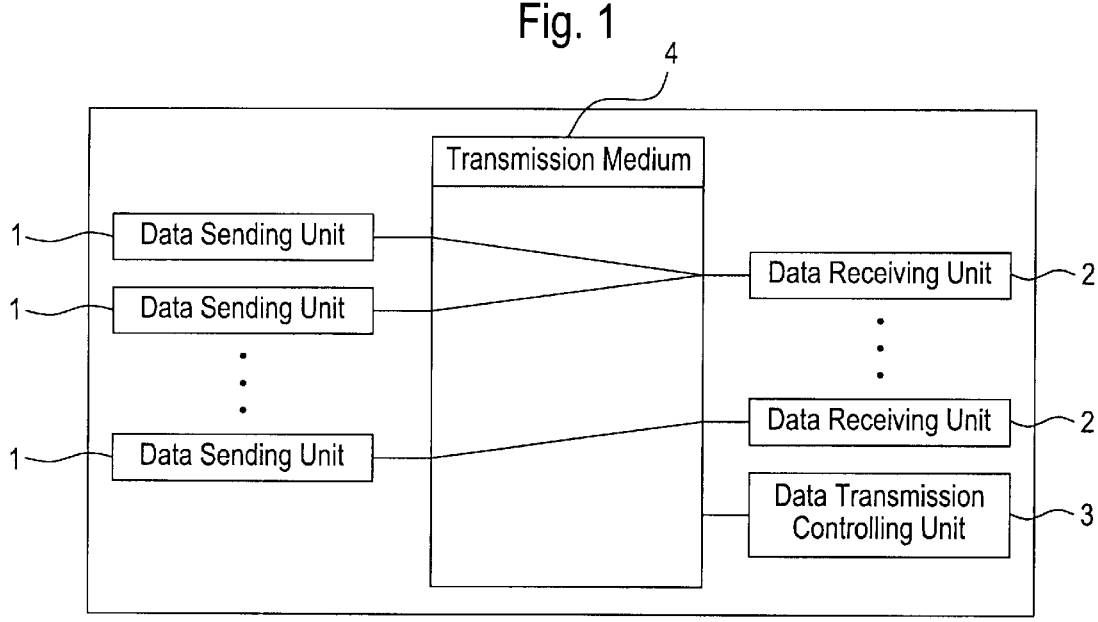
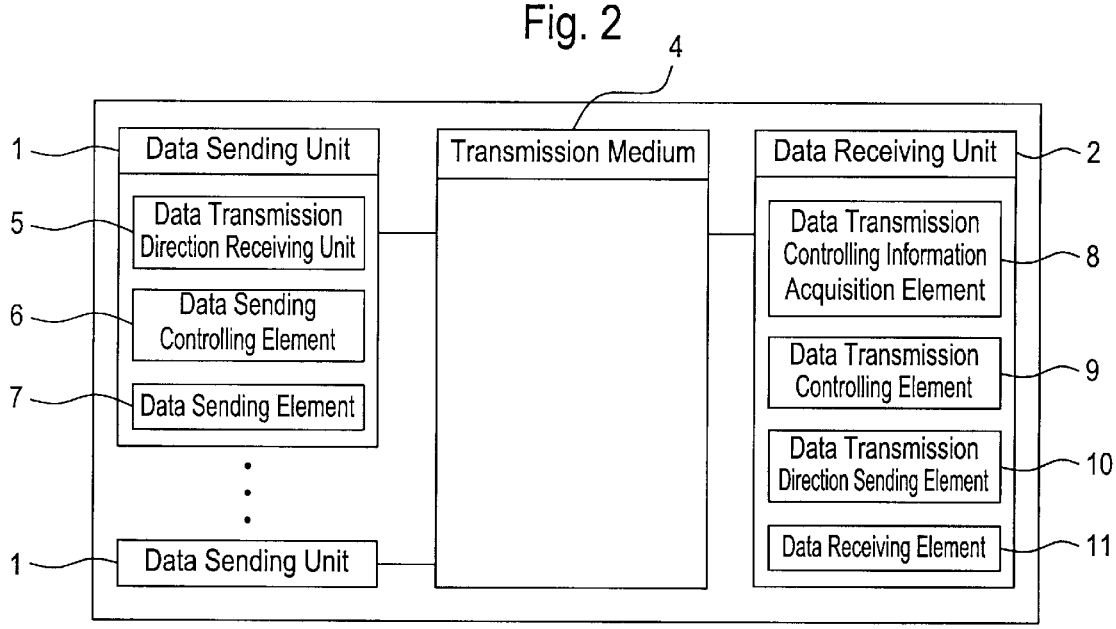
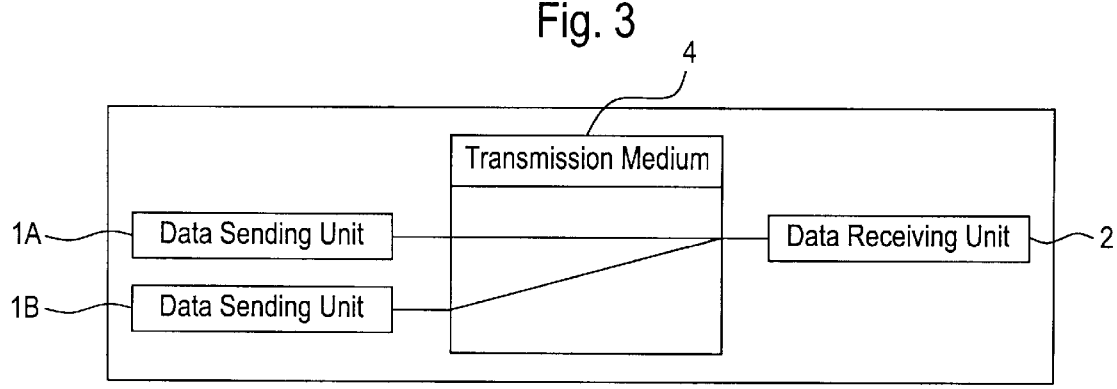

DATA TRANSMISSION SYSTEM HAVING FEATURE FOR PREDICTING TIME COMPLETION BASED ON CHANGING OF STATES OF USE OF BANDWIDTH AND TIME REQUIRED FOR RETRANSMISSION

BACKGROUND OF THE INVENTION

1. Field of the Invention

The present invention relates to a method of data transmission and a system using it, and in particular relates to a method of data transmission and a system using it for performing contention control among attempts of data transmission in the case where plural data transmission attempts are executed on a shared transmission medium on a computer network.

2. Discussion of the Related Art

A computer network consists of at least one transmission medium and a plurality of terminals connected thereto. Attempts of data transmission among these terminals are conducted through the transmission medium. Transmission capability of the transmission medium is called transmission bandwidth which is represented as an amount of data transmitted per unit time. The transmission bandwidth has a limit:, and the maximum transmission bandwidth Rmax is a fixed finite value.

In a computer network, generally, a single transmission medium is used for plural attempts of data transmission to hold down the cost of structuring and maintaining the network to the minimum of necessity. If a bandwidth used by each data transmission attempt i at an arbitrary time point t is assumed to be ri (t) (i=1, 2, ..., n), and the total is assumed to be Σri (t), there occurs a shortage of the transmission bandwidth of the transmission medium in the case of Rmax<Σri (t), which results in a scramble for the transmission bandwidth. This is called contention for the transmission bandwidth.

If the contention occurs, data which could not gain a necessary bandwidth is lost. In the case the data is lost, re-transmission of the data is executed in general. However, this is a cause for deterioration in efficiency of use of the bandwidth [=an amount of data successfully transmitted/ bandwidth required for successful data transmission × time required for successful data transmission]. To efficiently utilize the finite maximum transmission bandwidth of the transmission medium, it is necessary to avoid the loss of data caused by the contention. The factors of deterioration in efficiency of use of the bandwidth are data transmitted for transmission control (protocol control), bandwidth which is not used for some reason related to the control, a time zone where transmission is not conducted, and so forth, as well as the data re-transmitted, namely, the data transmitted repeatedly.

An application on each terminal which executes data transmission in the network normally operates independently. Each of the applications is irrelevant to the state of data transmission of the other applications at all, and makes an attempt of data transmission completely independent of each other. Some of the applications provide timing of data transmission by human triggering, such as "telnet". Therefore, it is impossible to perform centralized prediction and administration of the states of a plurality of data transmission attempts (starting time, ending time, bandwidth to be used or the like) made by all these applications as a whole.

To avoid the contention, conventionally, information about the states of use of the transmission bandwidth which change every moment has been fed back to a sending control mechanism for each data transmission attempt from an observing point for use of the bandwidth, and thereby a control has been conducted so that difference between the available bandwidth R(t) obtained from the fed back information and the actually used bandwidth r(t), |R(t)−r(t)|, becomes zero.

However, in the actual network, there is a distance L between the observing point and the controlling point; accordingly, there occurs at least propagation delay Δt=distance L/velocity of light c>0 in the propagation of fed back information between them. As a result, it is impossible to accurately reduce the value of |R(t)−r(t)| to zero. In the case of (R(t)−r(t))>0, there are unused wasteful bandwidths, and in the case of (R(t)−r(t))<0, the loss of the data occurs. That is, the using efficiency is declined in either of the cases. In the latter case, a buffer can be disposed on the transmission path, whereby the loss of the data can be avoided if the data amount is less than the capacity of the buffer. However, since the capacity of the buffer is limited, there is still a possibility of loss of the data if a large number of data transmission requests are made at once.

As to the file transfer, printing service or the like among the applications performing data transmission, there are the following features:

(1) the data to be transmitted is held in the sending terminal before the transmission is started, and the amount of data is already known;

(2) in general, transmission controlling information such as the amount of data is exchanged between the sending terminal and the receiving terminal before the transmission is started;

(3) because the data to be transmitted is already held in the sending terminal, it is possible to control the transmission rate to be adopted;

(4) an acceptable range for the transmission delay is relatively wide; and (5) in a client-server type application, such as filing service or printing service, all pieces of data to be transmitted concentrate on the server.

Paying attention to these features, the applicant of the present invention has proposed a data transmission system and method for contention control of data transmission attempts (Japanese Patent Application No. 8-17949). In the proposal, it has been made possible to increase the efficiency of use of the bandwidth by performing centralized control of the order of data transmission attempts, bandwidths to be used, and so on, in advance, based on the data transmission controlling information for avoiding the contention.

Here, the proposal is described at first. FIG. 1 shows the method for contention control of data transmission attempts as a whole. The fundamental constituents of the computer network to which the contention control method is applied are: a data sending unit 1; a data receiving unit 2; a data transmission controlling unit 3 for accumulating pieces of information of all data transmission attempts and executing centralized administration; and a transmission medium 4 for connecting these units. There is only one data transmission control unit 3 for the transmission medium 4 shared by the plural attempts of data transmission. If there is only one data receiving unit 2 for the shared transmission medium 4, it is possible to integrate the data receiving unit 2 with the data transmission control unit 3. If there are plural data receiving units 2, the data transmission control unit 3 is required to be independent of at least a part of the plural data receiving units 2.

FIG. 2 shows an example of construction of each unit shown in FIG. 1. Here, the data transmission controlling unit 3 is assumed to be contained in the data receiving unit 2. The explanation for each unit is as follows.

(1) The data sending unit 1

The data sending unit 1 comprises a data transmission direction receiving element 5, a data sending controlling element 6, a data sending element 7, and so forth. The data transmission direction receiving element 5 receives a direction of data transmission sent by a data transmission direction sending element 10 of the data receiving unit 2. The data sending controlling element 6 controls starting or ending of data transmission attempt made by the data sending element 7, bandwidth to be used or the like in accordance with the direction of data transmission received by the data transmission direction receiving element 5. The data sending element 7 sends data to the data receiving unit 2 under the control of the data sending controlling element 6.

(2) The data receiving unit 2 (integrated with the data transmission controlling unit 3)

The data receiving unit 2 comprises a data transmission controlling information acquiring element 8, a data transmission controlling element 9, the data transmission direction sending element 10, a data receiving element 11, and so forth. The data transmission controlling information acquiring element 8 acquires necessary information among the pieces of data transmission controlling information exchanged between the sending unit and receiving unit before/during/after each of all attempts of data transmission. For example, before data transmission, the data transmission controlling information acquiring element 8 acquires information such as an identifier of the data sending unit 1, the amount of data to be transmitted, or the like. The data transmission controlling element 9 determines the time when the data transmission shown by the content of the data transmission controlling information becomes possible and an available transmission bandwidth based on the data transmission controlling information acquired by the data transmission controlling information acquiring element 8 and the states of use of the bandwidth by the data transmission now under execution. The data transmission direction sending element 10 sends the data transmission direction including the content of determination by the data transmission controlling element 9 to the data sending unit 1. The data receiving element 11 receives the data sent by the data sending unit 1.

In the case where a next data transmission is requested before the completion of data transmission now under execution, it is generally performed that the data transmission controlling unit 3 provides the direction for sending to the sending element which will execute the next data transmission after the completion of the preceding data transmission is detected (hereinafter, such method is referred to as handshaking). The similar method is also adopted by the construction example shown in FIG. 2. That is, the data transmission controlling element 9 detects the completion of data transmission by observing the state of transmission or by using a timer to determine a mode of the next data transmission, namely, the bandwidth to be used, the time of starting the data transmission and so forth, and then sends the direction for transmission to the relevant sending unit 1.

If data transmission requests are made by a couple of data sending units 1A and 1B as shown in FIG. 3 to the receiving unit 2 (integrated with the data transmission controlling unit 3), operations according to the handshaking are as shown in a flow chart in FIG. 4. There is a time interval T between the completion of preceding data transmission by the sending unit 1A and the start of next data transmission by the sending unit 1B. Hereinafter, the time T is referred to as a handshaking time. The handshaking time T is roughly classified into the following two parts.

t1: a time from the time point when the receiving unit 2 receives the last data from the sending unit 1A, detects the completion of transmission, determines and sends the direction for sending to the time point when the sending unit 1B receives the direction.

t2: a time from the time point when the sending unit 1B receives the direction for sending to the time point when the receiving unit 2 receives the first data prepared and sent by the sending unit 1B.

The handshaking time consisting of the above two parts of time is inevitable in the case where the handshaking is adopted.

If the handshaking is applied to procedures for changing the bandwidth to be used for an attempt of data transmission subsequent to the completion of another data transmission in a state where plural attempts of data transmission are executed by bandwidth division, the handshaking time as same as described above is generated. FIG. 5 is a flow chart showing the operations in the case.

In a terminal to which the pieces of data transmission controlling information are concentrated (a data transmission controlling unit), and in particular, in the case where the contention control method of performing centralized administration of plural data transmission attempts is adopted, if the procedures for starting data transmission and changing the bandwidth according to the completion of an attempt of data transmission are executed, the handshaking time is necessarily generated. During the handshaking time, data transmission from the sending unit to the receiving unit is not carried out, and as a result, there occurs unused bandwidth. Consequently, the handshaking time is a cause of reduction of efficiency of use of the bandwidth.

SUMMARY OF THE INVENTION

The present invention has been made in view of the above circumstances and has an object to provide a method of data transmission and a system using the same to obtain high efficiency of use of transmission bandwidth by removing a period of time between successive attempts of data transmission, in which no data transmission is executed, such as the handshaking time as described above.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and broadly described herein, a data transmission system having a data sending unit, a data receiving unit and a data transmission medium for data transmission from the data sending unit to the data receiving unit, comprises an element for generating feature information of data transmission from the data sending unit to the data receiving unit in advance of execution of the data transmission, an element for storing change of states of use of a bandwidth used by data transmission now under execution, an element for predicting a time of completion of the data transmission now under execution based on the change of states of use of the bandwidth and the feature information of the data transmission now under execution, an element for determining a transmission rate to be used by data transmission to be next executed at the time of completion of the data transmission now under execution based on the change of states of use of the bandwidth and the feature information of the data transmission to be next executed, and an element for executing the data transmission to be next executed from the data sending unit according to the transmission rate at the time of completion of the data transmission now under execution.

A data transmission method for transmitting data from a data sending unit to a data receiving unit through a data transmission medium according to the present invention comprises the steps of generating feature information of data transmission from the data sending unit to the data receiving unit in advance of execution of the data transmission, storing change of states of use of the bandwidth by data transmission now under execution, predicting a time of completion of the data transmission now under execution based on the change of states of use of the bandwidth and the feature information of the data transmission now under execution, determining a transmission rate for data transmission to be next executed at the time of completion of the data transmission now under execution based on the change of states of use of the bandwidth and the feature information of the data transmission to be next executed, and executing the data transmission to be next executed from the data sending unit according to the transmission rate at the time of completion of the data transmission now under execution.

That is, the contention control method for performing centralized administration of plural attempts of data transmission by a terminal to which pieces of data transmission controlling information are concentrated (data transmission controlling unit) has the following features:

a) the amount of data to be transmitted is known in advance of execution of transmission based on the data transmission controlling information which has been acquired.

b) the starting time of transmission and the transmission bandwidth used by each attempt of data transmission are already known in advance of execution of transmission because they are determined by the data transmission controlling unit.

In view of these two features, the time point of completion of data transmission is predictable by obtaining the time required for transmission by calculating (the amount of data/the used transmission bandwidth) and adding the time required for transmission which has been obtained to the time of starting data transmission. The time of completion of data transmission is notified before the time is coming to a sending unit which will execute another attempt of data transmission, and on receiving the notification, the sending unit starts data transmission or changes the transmission rate at the notified time point, whereby the time period between the successive attempts of data transmission in which no data transmission is carried out can be removed.

For execution of data transmission by the sending unit with high precision at the time point of completion of data transmission which has been notified, attention should be paid to the following matter.

In the sending unit, there is a time required for preparation for sending from the time point when the sending operation is started to the time point when the data is actually forwarded to the transmission medium. More specifically, it is, for example, a time period wherein the data is read from the memory, forwarded to the element for sending the data to the network, and then actually sent. If the time period is sufficiently shorter than the time required for transmission and the influence over the efficiency of use of the bandwidth can be ignored, the sending operation may be started at the notified time of completion of data transmission. If the influence caused by the time for preparation cannot be ignored, the sending operation should be started in advance of the notified time by the time for preparation. Thereby it is possible to avoid the deterioration of efficiency of use of the bandwidth caused by the time for preparation for sending.

In the case of changing the bandwidth, there also occurs a preparation time as same as the case of starting the sending operation at the notified time. If an influence to the using efficiency of the bandwidth caused by the preparation time is too large to be ignored, starting of the changing operation should be advanced by the preparation time.

To carry out exact prediction of the time point of completion of data transmission, attention should be paid to the following matter.

In the case where the data transmission is executed through the computer network, transmission errors generally occur. The data failed to be transmitted is normally recovered by re-transmission. However, a time required for a single attempt of successful data transmission becomes longer by the time required for re-transmission (the time for re-transmitting the data and the time required for protocol processing between the sending unit and receiving unit for executing the re-transmission). Accordingly, to predict the time point of completion of data transmission with higher precision, it is necessary to add the time required for re-transmission to the time required for data transmission obtained by the calculation of (the amount of data/used transmission bandwidth).

It is possible to obtain the time required for re-transmission by multiplying the number of times of re-transmission attempts occurring in a single attempt of successful data transmission calculated based on a rate of occurrence of transmission error [=(an amount of data failed to be transmitted in a time unit)/(an amount of data successfully transmitted in the time unit)] by the time required for a single re-transmission attempt.

The transmission error includes, mainly, errors peculiar to the transmission medium (for example, bit error) and errors caused by occurrence of contention (for example, loss of the data caused by the buffer overflow). The rate of occurrence of the transmission error of the former is almost constant in each unit time and does not vary severely, but the rate of occurrence of the transmission error of the latter sharply varies within a short period. However, in the contention control according to the centralized administration which the present invention intends, the contention does not occur in principle, and therefore severe deterioration of the rate of occurrence of the transmission error in the latter case never occurs. The rate of occurrence of the transmission error is almost constant independent of the time unit. Consequently, the time required for re-transmission can be obtained in advance by calculating the number of times of re-transmission attempts based on the rate of occurrence of the transmission error of the object network acquired by prior measurement or the like.

It is necessary to take the following points into consideration for predicting the time point of completion of data transmission with far more accuracy. It is indispensable to acquire an exact value of the transmission bandwidth for obtaining the time point of completion of an attempt of data transmission with high precision. The value of the transmission bandwidth is determined by the data transmission controlling unit and is notified to the data sending unit as one of the contents of the direction for transmission. If it is possible for the data sending unit to exactly control the transmission rate in accordance with the directed value, no problem occurs. However, in the case where the data sending unit cannot control the transmission rate as directed by reason of implementation or the like, a difference occurs between the directed value of the transmission bandwidth and the actual value of the transmission rate, whereby an error occurs also in the prediction of the time point of completion of data transmission. This leads to generation of an unused bandwidth between two successive attempts of data transmission, or in contrast, leads to generation of contention, and thereby the efficiency of use of the bandwidth is lowered. Accordingly, to predict the time point of completion of data transmission with high precision, the data transmission controlling unit having the function of predicting the time point of completion of data transmission is required to acquire an exact value of the transmission rate from the data sending unit.

With the procedures described so far, the time period between the successive attempts of data transmission in which no data transmission is carried out can be removed; therefore, it is made possible to obtain the high efficiency of use of the bandwidth.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings:

FIG. 1 illustrates a data transmission environment to which a conventional art or the present invention is applied;

FIG. 2 is a block diagram showing an example of the conventional art;

FIG. 3 illustrates an outline of data transmission in the example of the conventional art or each embodiment of a system of data transmission according to the present invention;

DETAILED DESCRIPTION OF THE PREFERRED EMBODIMENTS

Figure 4:
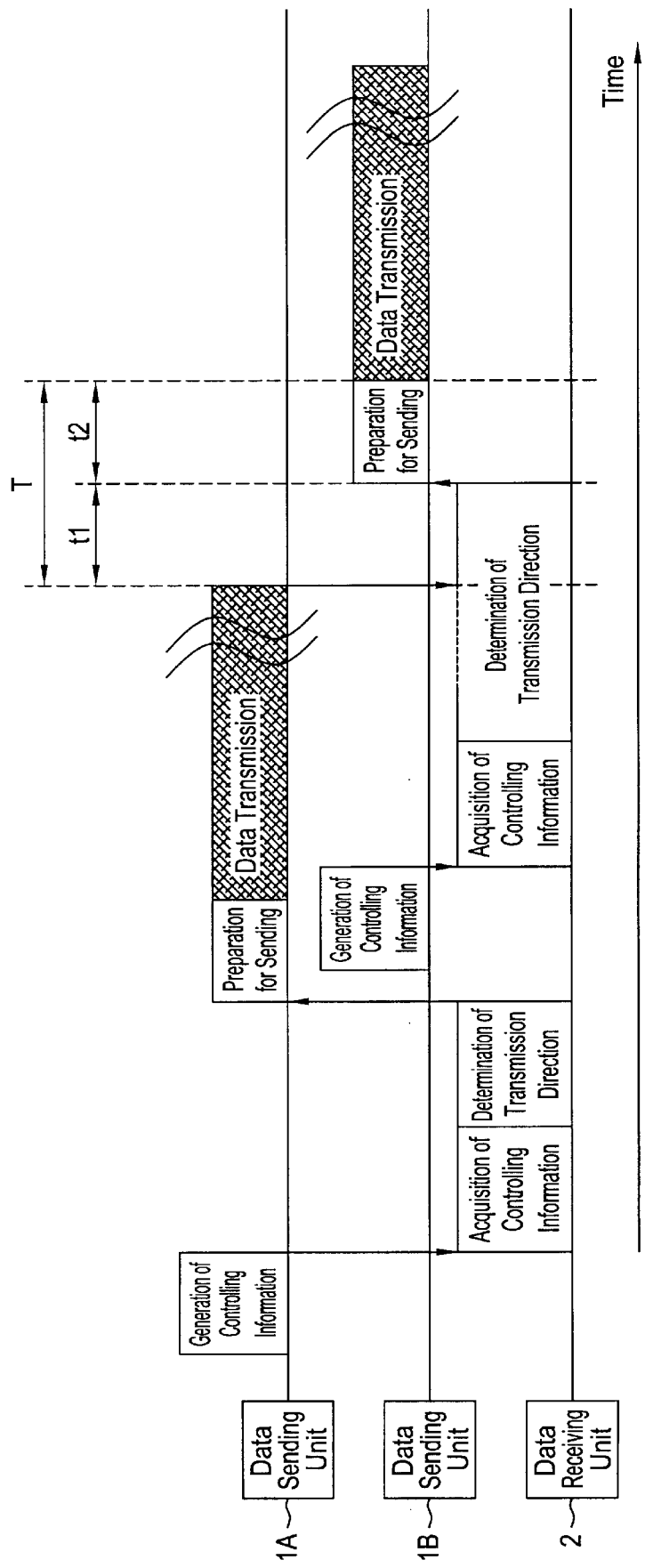
FIG. 4 illustrates an example of operations of the conventional art.
Figure 5:
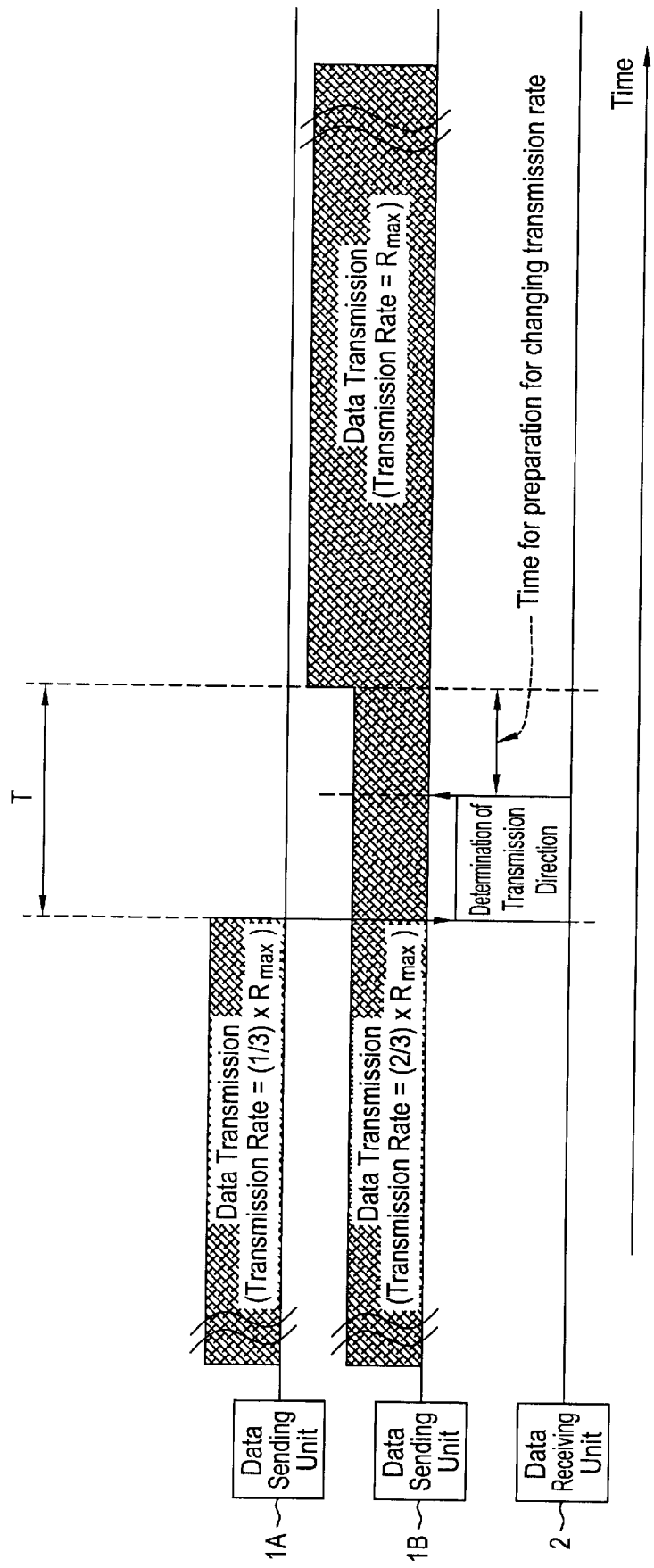
FIG. 5 illustrates another example of operations of the conventional art.
Figure 6:
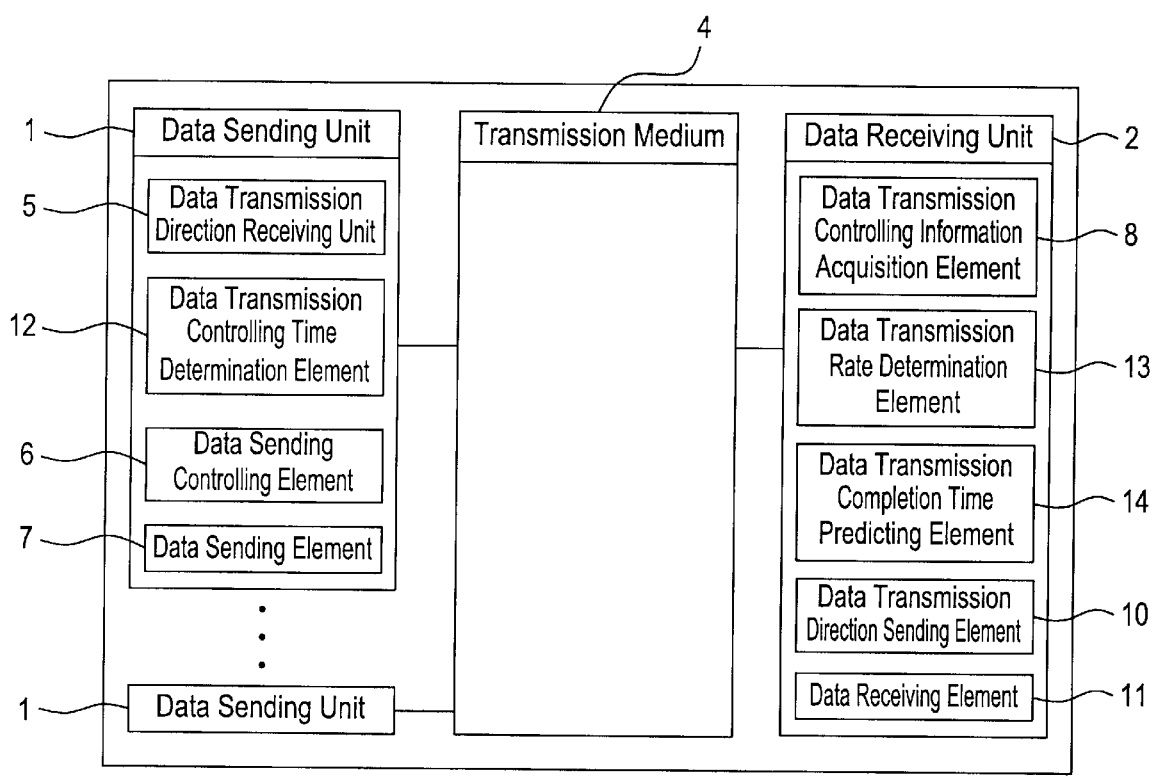
FIG. 6 is a block diagram showing the construction of a first embodiment of the system of data transmission according to the present invention.

Preferred embodiments of a method of data transmission and a system using the same according to the present invention is now described in detail based on the drawings.
First Embodiment FIG. 6 shows a first embodiment of a system of data transmission according to the present invention. In the figure, a data transmission system shown by the embodiment comprises a data sending unit 1, a data receiving unit 2 and a transmission medium 4. Each unit is now described as follows.

(1) The data sending unit 1

The data sending unit 1 executes data transmission with the data receiving unit 2 through the transmission medium 4. There are at least one data sending unit 1 for a single transmission medium which is shared. The data sending unit 1 comprises a data transmission direction receiving element 5, a data transmission controlling time determination element 12, a data sending controlling element 6 and a data sending element 7.

The data transmission direction receiving element 5 receives a direction for data transmission sent by a data transmission direction sending element 10 of the data receiving unit 2.

The data transmission controlling time determination element 12 determines the time point to control the data transmission based on the time point of completion of data transmission now under execution contained in the direction for data transmission received by the data transmission direction receiving element 5. If an attempt of new data transmission is to be started, a time point for starting sending operation is obtained by subtracting a time required for preparation for sending from the time point of completion of data transmission which has been notified. In the case where the attempt of data transmission has already been started and the transmission rate is to be changed, a time point to start changing operation of the transmission rate is obtained by subtracting a time required for changing the transmission rate from the time point of completion of data transmission which has been notified. The time required for preparation for sending and the time required for changing transmission rate are stored in advance.

As described in the summary of the invention, if the influence of the time required for preparation for sending and the time required for changing transmission rate over the efficiency of use of the bandwidth is small enough to be ignored, the time point of completion of data transmission which has been notified can be assumed to be the time point to start sending operation or the time point to start changing operation of transmission rate without executing additional calculation.

The data transmission controlling element 6 controls data transmission executed by the data sending element 7 in accordance with the directed transmission bandwidth contained in the direction for data transmission received by the data transmission direction receiving element 5 and the time point to control data transmission determined by the data transmission controlling time determination element 12.

Under the control of the data transmission controlling element 6, the data sending element 7 sends data to the data receiving unit 2.

(2) The data receiving unit 2

The data receiving unit 2 comprises a data transmission controlling information acquiring element 8, a data transmission rate determination element 13, a data transmission completion time predicting element 14, a data transmission direction sending element 10 and a data receiving element 11. The data receiving unit 2 executes data transmission with the data sending unit 1 though the transmission medium 4. There is only one data receiving unit 2 for a single transmission medium which is shared. In this embodiment, the data receiving unit is integrated with a data transmission controlling unit 3, and has a contention controlling function.

The data transmission controlling information acquiring element 8 acquires necessary information among the pieces of data transmission controlling information exchanged between the data sending unit and the data receiving unit before/during each data transmission attempt. There are several kinds of data transmission controlling information acquired before data transmission attempt, for example, a sending unit identifier, a amount of data to be transmitted, a requested transmission rate, and so on. There are also some kinds of data transmission controlling information acquired during the data transmission, such as a requested transmission rate or the like.

The data transmission rate determination element 13 determines a bandwidth to be assigned to each attempt of data transmission based on the requested transmission rate acquired by the data transmission controlling information acquiring element 8 and the states of use of the bandwidth. For an attempt of data transmission which makes a request to start transmission, a requested transmission rate is compared with an unused bandwidth, if any, at the time of the request is made, and a smaller one is determined to be the rate to be assigned. If there is no unused bandwidth, the data transmission rate determination element 13 waits for completion of any one of data transmission attempts now under execution, and at the time when any one of the attempts of data transmission is completed, the requested transmission rate is compared with an unused bandwidth generated by completion of the transmission, and the smaller one is determined to be the bandwidth to be assigned. For an attempt of data transmission which makes a request for changing the transmission rate, requested transmission rate is determined to be the bandwidth to be assigned if the request is acceptable at once, or at the time any one of the attempts of data transmission is completed. If the request for changing the transmission rate is still unacceptable, the request is ignored, for example.

The data transmission completion time predicting element 14 predicts the time of completion of data transmission now under execution based on the transmission starting time which has been notified to the data transmission now under execution, the time for changing the transmission rate, the available bandwidth and the amount of data to be transmitted acquired by the data transmission controlling information acquiring element 8.

If there is an unused bandwidth, the data transmission direction sending element 10 sends both of an arbitrarily determined time assumed to be the time of completion of data transmission now executed and a bandwidth to be assigned determined by the data transmission rate determination element 13 assumed to be the available bandwidth, as the data transmission direction information, to the sending unit 1 which is to start an attempt of new data transmission in advance of the time of completion of data transmission now under execution (namely, arbitrarily determined time). If there is no unused bandwidth, the bandwidth to be assigned determined by the data transmission rate determination element 13 is assumed to be the available bandwidth, and then sent together with the time of completion of data transmission now under execution predicted by the data transmission completion time predicting element 14 as the data transmission direction information to the sending unit 1 in advance of the time of completion of data transmission. The time of completion of data transmission is regarded as the time to start the data transmission by the sending unit 1 which is to start an attempt of new data transmission.

If one of the sending units 1 makes a request to change the transmission rate, and if the request is accepted at once, the data transmission direction sending element 10 assumes the arbitrarily determined time to be the time of completion of data transmission now under execution and assumes the bandwidth to be assigned determined by the data transmission rate determination element 13 to be the available bandwidth, and then sends both of them as the data transmission direction information to the sending unit 1 in advance of the time of completion of data transmission now under execution (namely, arbitrarily determined time). In the case where the request will be acceptable at the time when any one of the attempts of data transmission now under execution is completed, the bandwidth to be assigned determined by the data transmission rate determination element 13 is assumed to be the available bandwidth, and as the data transmission direction information, sent to the sending unit 1 together with the time of completion of data transmission now under execution predicted by the data transmission completion time predicting element 14 in advance of the time of completion of data transmission is coming. In the case other than described above (the request for changing the transmission rate is still unacceptable even at the time when an attempt of data transmission is completed), the transmission direction information is not sent, for example. The time of completion of data transmission is regarded as the time for changing the transmission rate by the sending unit 1 which desires to change the transmission rate.

The content of the data transmission direction information about each attempt of data transmission sent by the data transmission direction sending element 10 is retained in the receiving unit 2 as a part of information showing the states of use of the bandwidth, and utilized by the data transmission rate determination element 13 or the data transmission completion time predicting element 14.

The data receiving element 11 receives data sent by the data sending unit 1.

Figure 7:
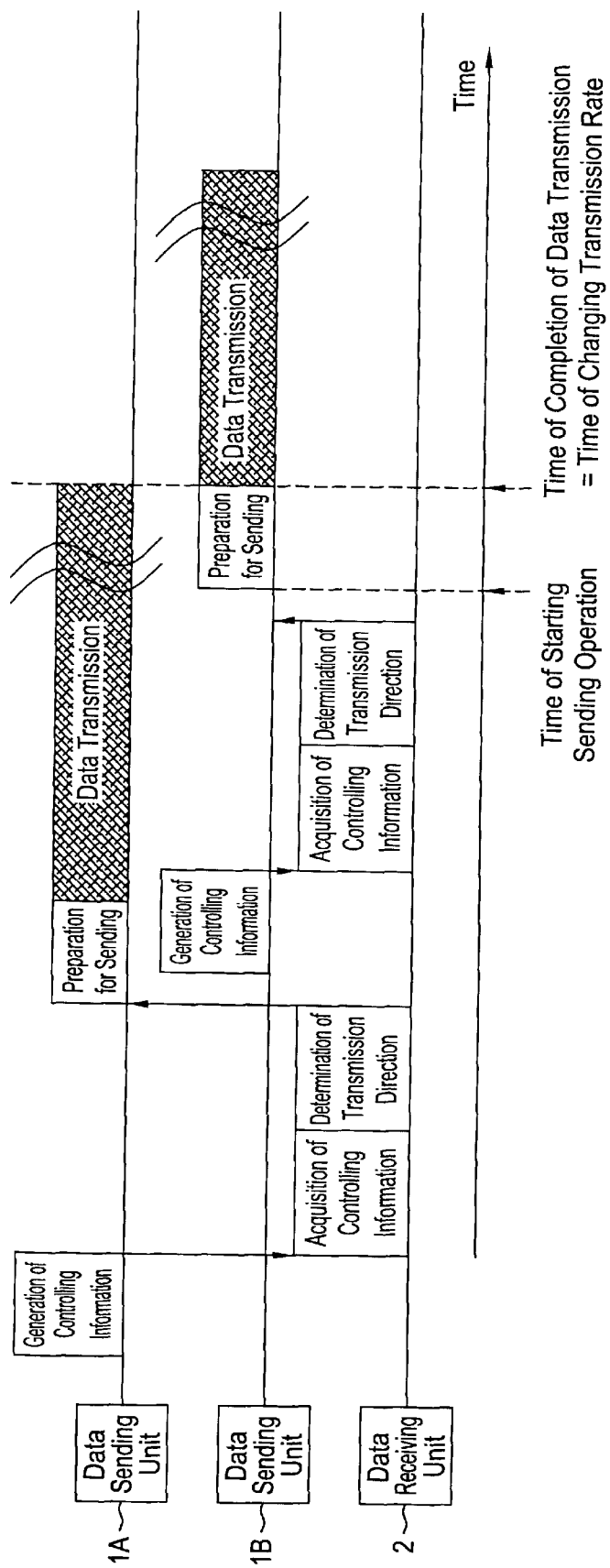
FIG. 7 illustrates an example of operations of the first embodiment of the system of data transmission according to the present invention.

Next, operations of the embodiment are explained. FIG. 7 is a flow chart showing operations in the case where a couple of data sending units 1A and 1B shown in FIG. 3 make a request for executing data transmission to the data receiving unit 2. The data receiving unit 2 sends a direction for transmission to the data sending unit 1 B in advance of completion of data sending operation by the data sending unit 1A, and has the sending unit 1B prepare for sending so as to be able to start sending just at the time point of completion of data sending by the data sending unit 1A. Thus sending operation by the data sending unit 1B is started immediately after the data sending by the data sending unit 1A is completed, and therefore the efficiency of use of bandwidth is improved.

Figure 8:
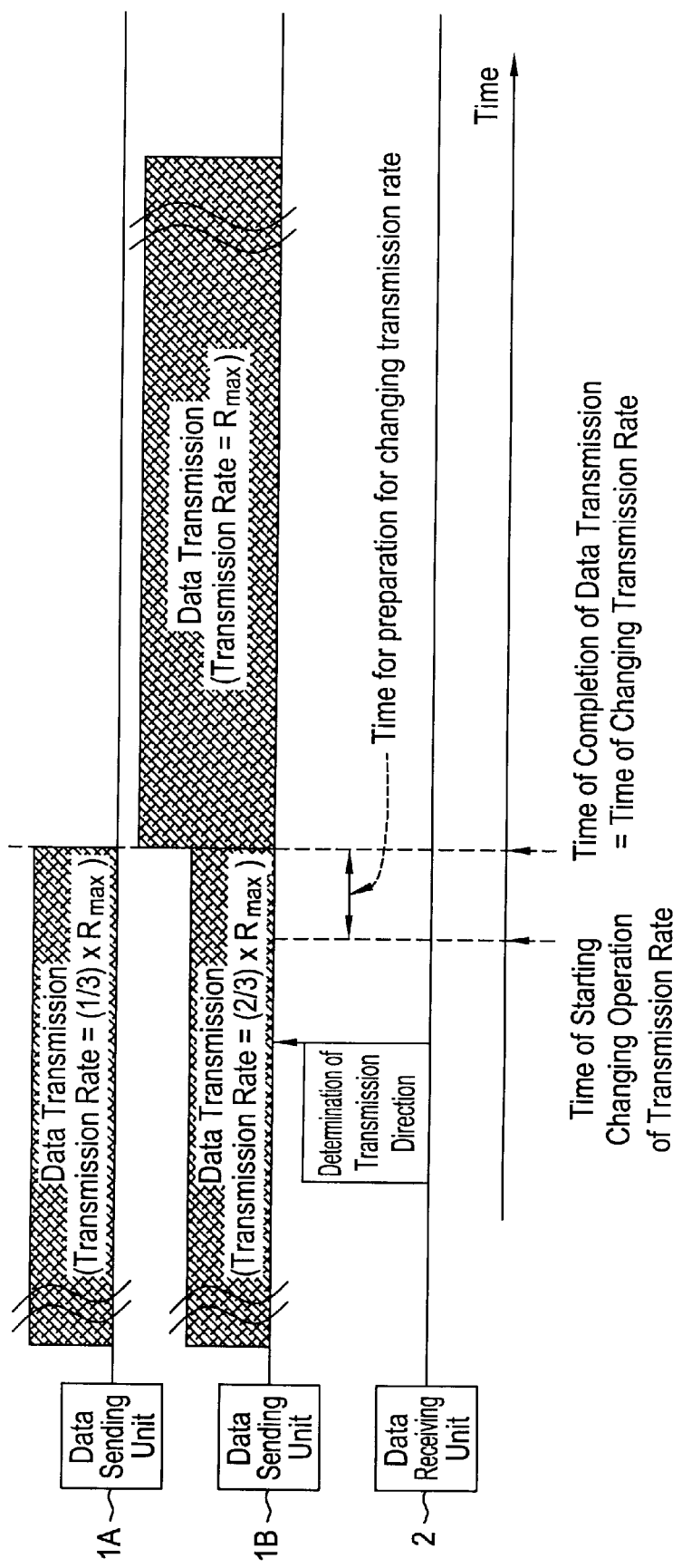
FIG. 8 illustrates another example of operations of the first embodiment of the system of data transmission according to the present invention.

FIG. 8 is a flow chart showing operations in the case where a bandwidth used for an attempt of data transmission is changed corresponding to completion of another attempt of data transmission on condition that two attempts of data transmission are executed by bandwidth division. Here, it is assumed that the data sending unit 1A completes data transmission, and corresponding thereto, the bandwidth used for data transmission by the data sending unit 1B is changed. In this case, also, the data receiving unit 2 sends the direction for transmission to the data sending unit 1B in advance for making the data sending unit 1B start preparation for changing the transmission rate so as to render the transmission rate larger at the time when data transmission by the data sending unit 1A is completed. Thus the transmission rate of the data sending unit 1 B increases immediately after data transmission by the data sending unit 1A is completed, and thereby the efficiency of use of the bandwidth is improved. Needless to say, the time of completion of data transmission or the like is calculated again in accordance with the change of the transmission rate.

Second Embodiment

A second embodiment of the system of data transmission is now described. If there are plural data receiving units 2 for a single transmission medium 4 which is shared, it is necessary to separate the data transmission controlling unit 3 from at least a part of the data receiving units 2 (that is, one of the data receiving units 2 may possess the function of the data transmission controlling unit 3.). This case is regarded as the second embodiment, and the construction thereof is shown in FIG. 9.

Figure 9:
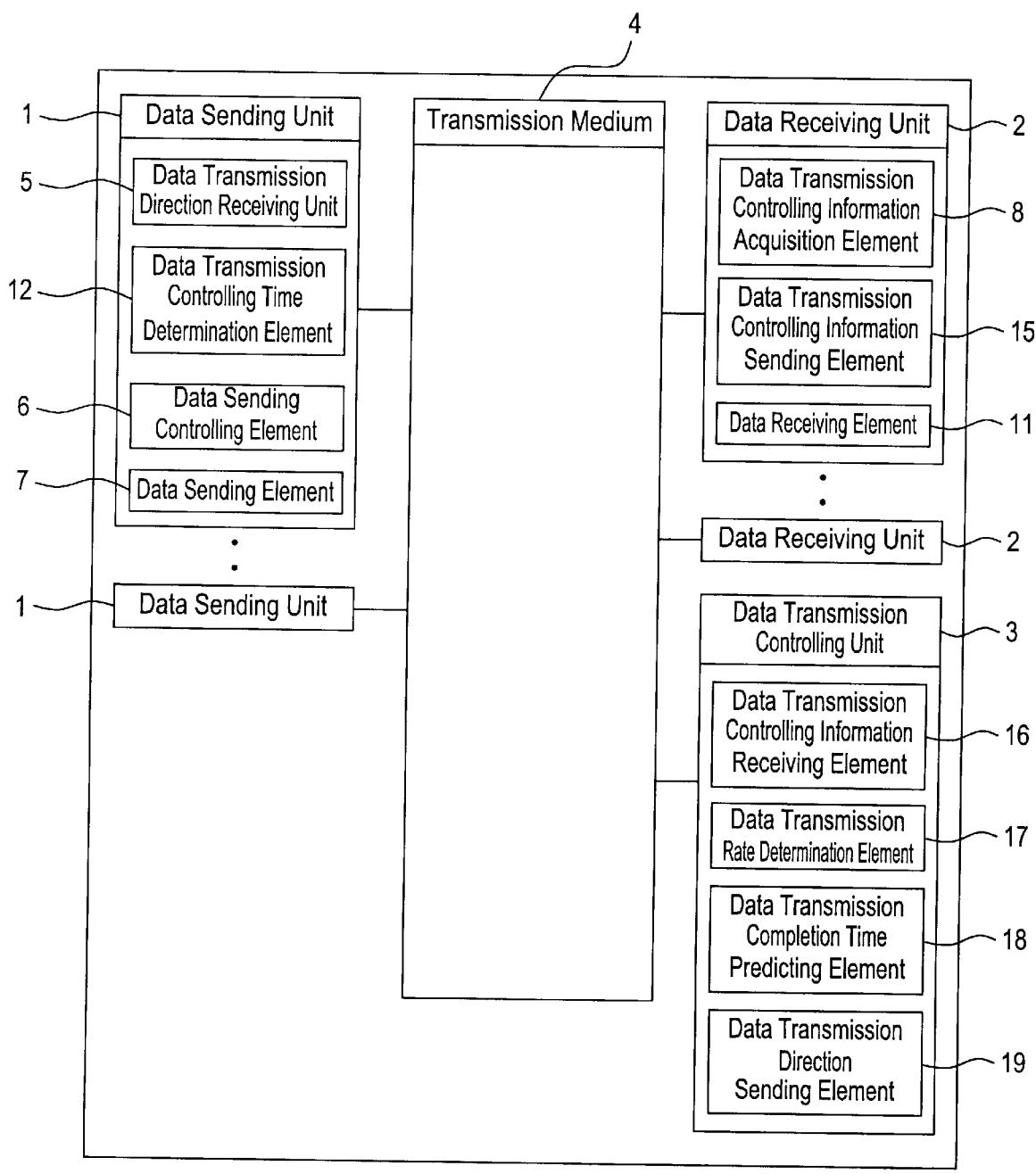
FIG. 9 is a block diagram showing the construction of a second embodiment of the system of data transmission according to the present invention.

In FIG. 9, the embodiment of the system of data transmission comprises the data sending unit 1, the data receiving units 2, the data transmission controlling unit 3 and so forth.

(1) The data sending unit 1

The data sending unit 1 of this embodiment is as same as that of the first embodiment.

(2) The data receiving unit 2

The data receiving unit 2 comprises a data transmission controlling information acquisition element 8, a data transmission controlling information sending element 15, a data receiving element 11 and so forth. The data receiving unit 2 executes data transmission with the data sending unit 1 through the transmission medium 4. One or more data receiving units 2 exist for a single transmission medium 4.

The data transmission controlling information acquisition element 8 and the data receiving element 11 are constituted as same as those of the first embodiment. The data transmission controlling information sending element 15 sends data transmission controlling information acquired by the data transmission controlling information acquisition element 8 to the data transmission controlling unit 3.

(3) The data transmission controlling unit 3

The data transmission controlling unit 3 comprises a data transmission controlling information receiving element 16, a data transmission rate determination element 17, a data transmission completion time predicting element 18, a data transmission direction sending element 19, and so forth, and performs contention control among the attempts of data transmission which share the transmission medium 4. There is only one data transmission controlling unit 3 for a single transmission medium which is shared.

The data transmission controlling information receiving element 16 receives the data transmission controlling information sent by the data transmission controlling information sending element 15 of the data receiving unit 2. The data transmission rate determination element 17 and the data transmission completion time predicting element 18 are constituted as same as the data transmission rate determination element 13 and the data transmission completion time predicting element 14 of the first embodiment, respectively, except that the data transmission controlling information is acquired from the data transmission controlling information receiving element 16. The data transmission direction sending element 19 is as same as the data transmission direction sending element 1 0 of the first embodiment.

Similar to the first embodiment, starting of data transmission and change of the transmission rate in this embodiment are carried out so as to remove the unused bandwidth as shown in FIGS. 7 and 8, whereby the efficiency of data transmission is improved.

Third Embodiment

Figure 10:
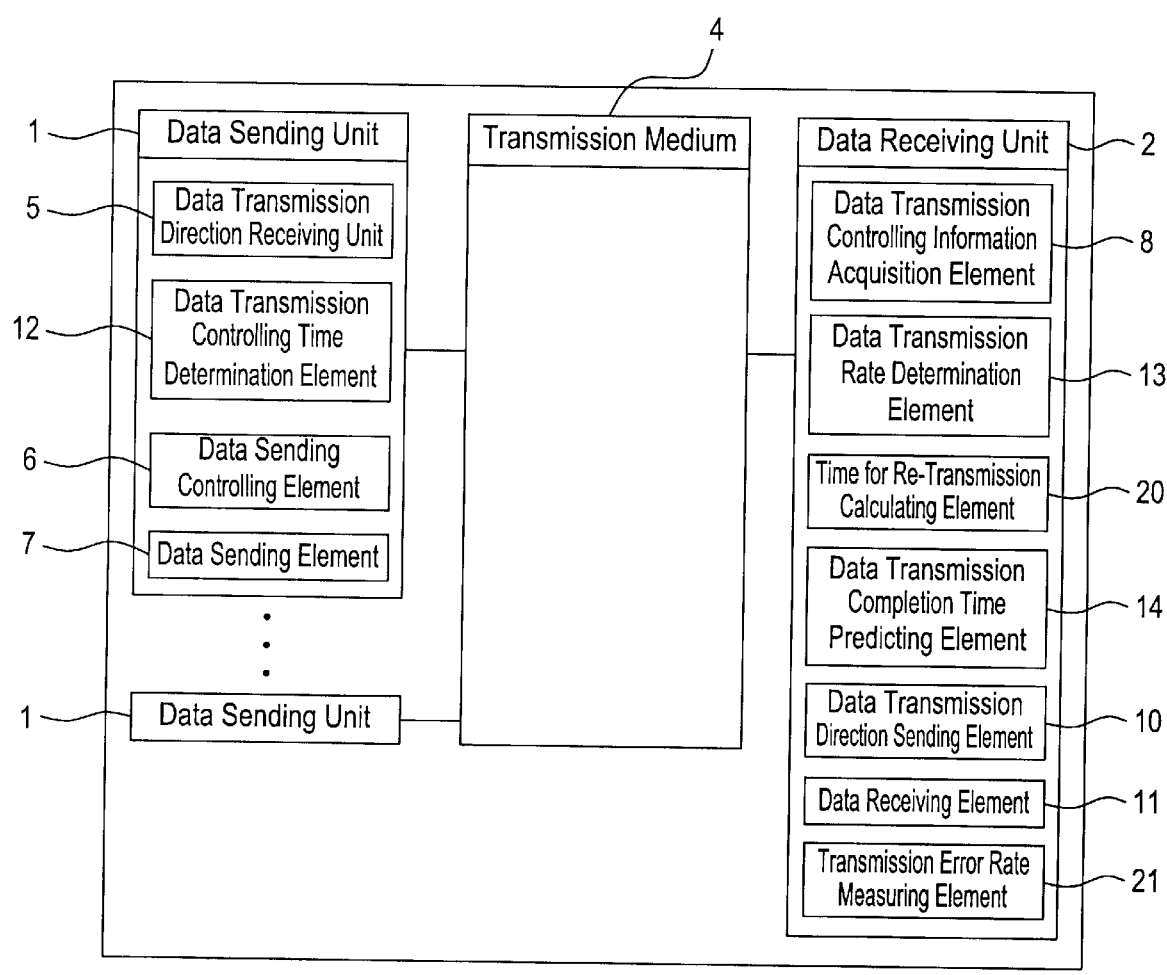
FIG. 10 is a block diagram showing the construction of a third embodiment of the system of data transmission according to the present invention.

FIG. 10 shows a third embodiment of the system of data transmission according to the present invention. This is the case where the time required for re-transmission is included in prediction of the time of completion of data transmission.

(1) The data sending unit 1

The data sending unit 1 of the third embodiment is as same as that of the first embodiment.

(2) The data receiving unit 2

The data receiving unit 2 comprises the data transmission controlling information acquisition element 8, the data transmission rate determination element 13, a time for re-transmission calculating element 20, the data transmission completion time predicting element 14, the data transmission direction sending element 10, the data receiving element 11, a transmission error rate measuring element 21, and so forth.

The data transmission controlling information acquisition element 8, the data transmission rate determination element 13, the data transmission direction sending element 10 and the data receiving element 11 are constituted as same as those of the first embodiment.

The time for re-transmission calculating element 20 obtains the time required for re-transmission based on a rate of occurrence of transmission error measured by the transmission error rate measuring element 21, a time required for a single attempt of re-transmission and an amount of data to be transmitted acquired by the data transmission controlling information acquisition element 8. The time required for a single attempt of re-transmission is stored in advance. The data transmission completion time predicting element 14 predicts the time of completion of data transmission based on the information acquired in the first embodiment and the time required for re-transmission calculated by the time for re-transmission calculating element 20. The transmission error rate measuring element 21 obtains the rate of occurrence of transmission error in accordance with statistical information about the data received by the data receiving element 11. For example, in the case of detecting the transmission error per every frame unit, the rate of occurrence of transmission error is obtained by the following calculation.

The rate of occurrence of transmission error=[(the number of frames including errors in a unit time)/(the total number of frames received in a unit time)].

Figure 11:
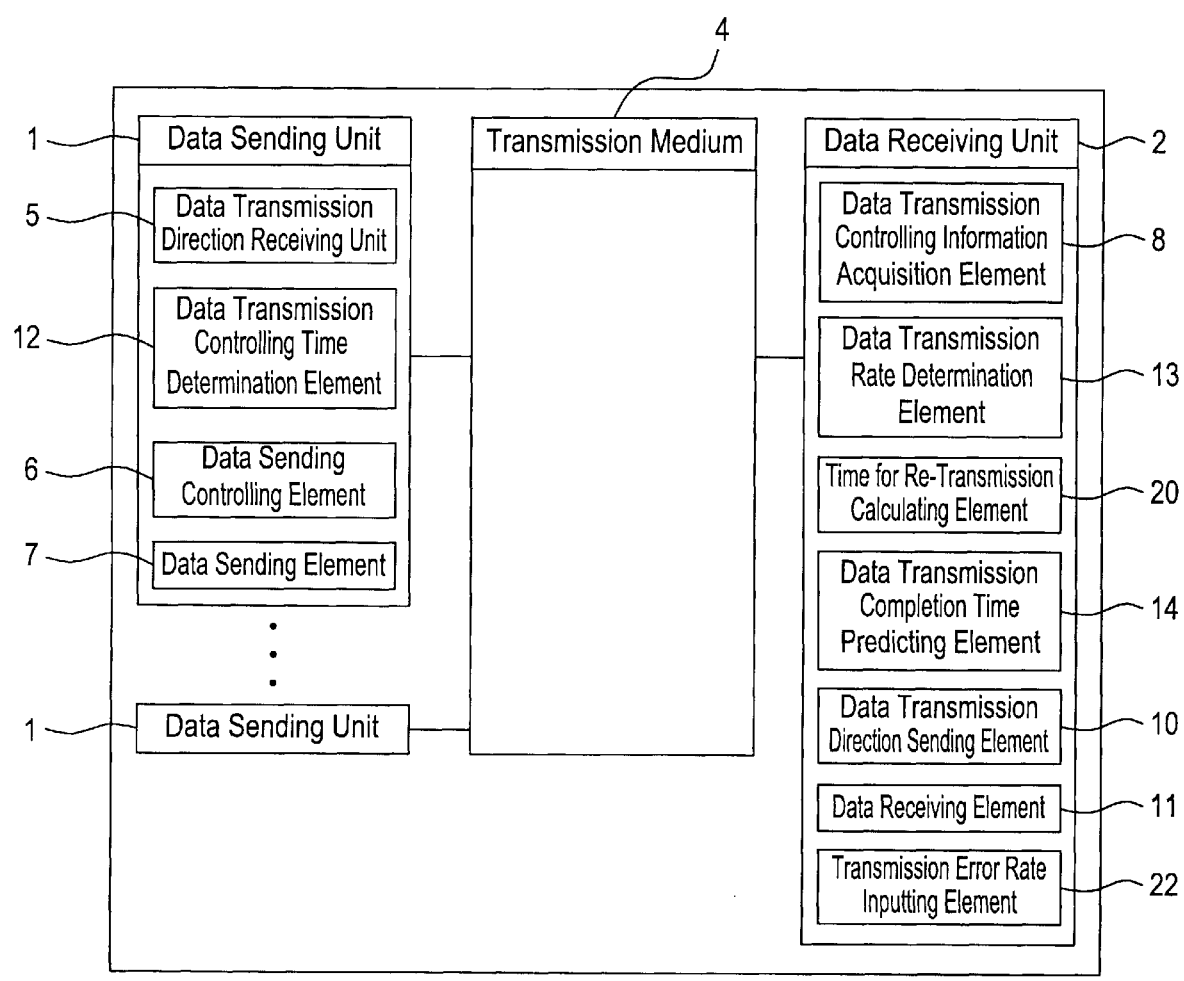
FIG. 11 is a block diagram showing the construction of a variation of the third embodiment of the system of data transmission according to the present invention.

The transmission error rate measuring element 21 may be replaced with a transmission error rate inputting element 22 having function of inputting the rate of transmission error through a user interface. The example of the case is shown in FIG. 11.

In this example, as same as the first embodiment, data transmission and change of data transmission rate are started so as to remove the unused bandwidth as shown in FIGS. 7 and 8, and thereby the efficiency of data transmission is improved. Moreover, since start of data transmission and change of transmission rate are executed in view of re-transmission caused by the transmission error, the efficiency of use of the bandwidth is securely improved.

Fourth Embodiment

Figure 12:
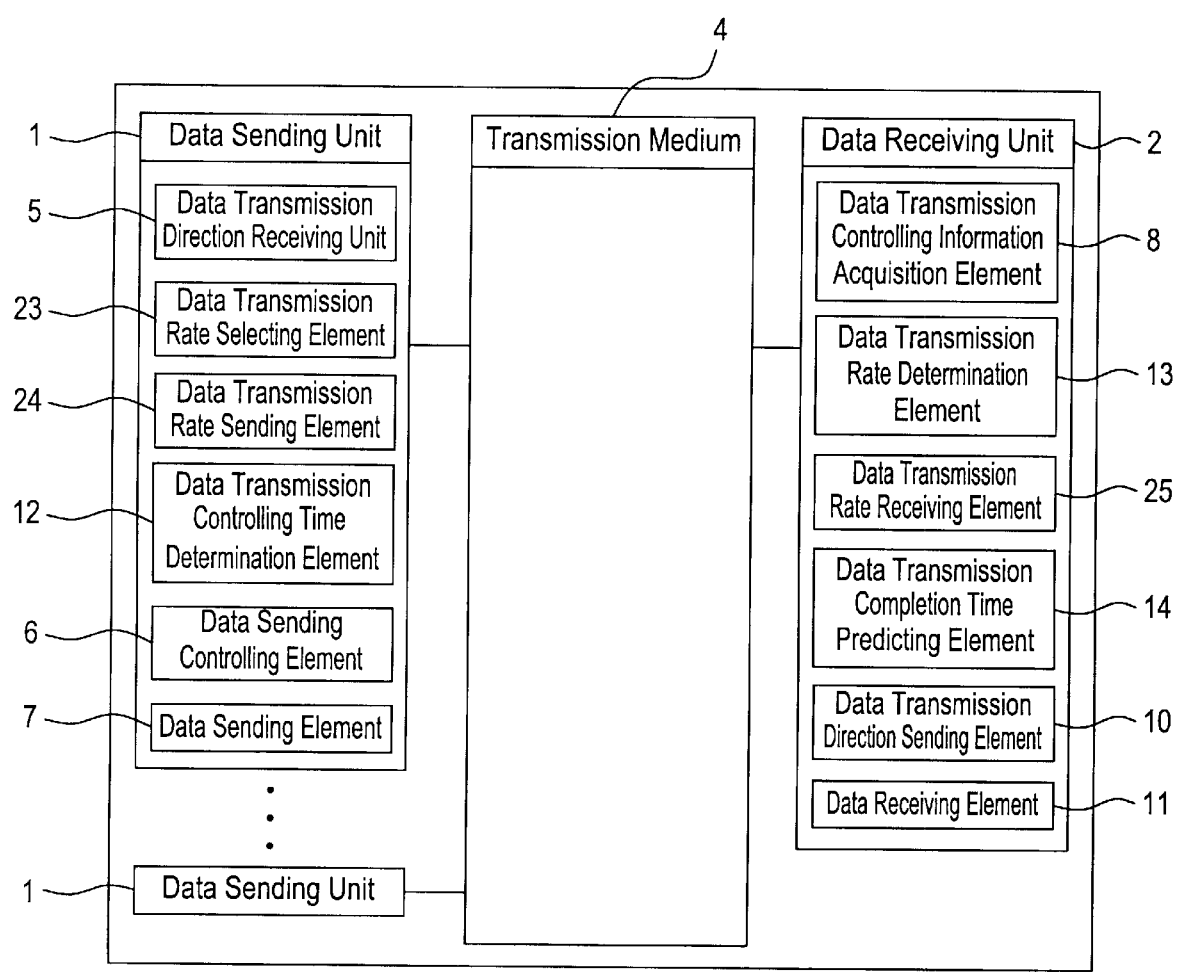
FIG. 12 is a block diagram showing the construction of a fourth embodiment of the system of data transmission according to the present invention.

FIG. 12 shows a fourth embodiment of the system of data transmission according to the present invention, which is the case where the actual value of the transmission rate is obtained from the data sending unit.

(1) The data sending unit 1

The data sending unit 1 comprises the data transmission direction receiving element 5, a data transmission rate selecting element 23, a data transmission rate sending element 24, the data transmission controlling time determination element 12, the data sending controlling element 6, the data sending element 7, and so forth. The data transmission direction receiving element 5, the data transmission controlling time determination element 12 and the data sending element 7 are constructed as same as those of the first embodiment.

The data transmission rate selecting element 23 determines a transmission rate for actual transmission based on the directed bandwidth contained in the data transmission direction received by the data transmission direction receiving element 5. For example, a maximum value which is not more than a directed bandwidth and able to be actually selected by the sending unit is selected as the transmission rate. The data transmission rate sending element 24 sends the actual value of the transmission rate selected by the data transmission rate selecting element 23 to the data receiving unit 2. The data transmission controlling element 6 controls data transmission in accordance with the transmission rate selected by the data transmission rate selecting element 23 and the data transmission controlling time determined by the data transmission controlling time determination element 12.

(2) The data receiving unit 2

The data receiving element 2 comprises the data transmission controlling information acquisition element 8, the data transmission rate determination element 13, a data transmission rate receiving element 25, the data transmission completion time predicting element 14, the data transmission direction sending element 10, the data receiving element 11, and so forth. The data transmission controlling information acquisition element 8, the data transmission direction sending element 10 and the data receiving element 11 are constituted as same as those of the first embodiment. The data transmission rate determination element 13 determines the bandwidth to be assigned to each attempt of data transmission according to the requested transmission rate acquired by the data transmission controlling information acquisition element 8 and the states of use of the bandwidth obtained based on the actual value of the transmission rate used by data transmission now under execution received by the data transmission rate receiving element 25. When the data transmission rate receiving element 25 receives the actual value of transmission rate of the data transmission, the value of the bandwidth stored in the data transmission rate determination element 13 is changed from the directed value to the actual value.

The data transmission rate receiving element 25 receives the actual value of the transmission rate from the data sending unit 1. The data transmission completion time predicting element 14 predicts the time of completion of the data transmission based on the time of starting data transmission, the time of changing the transmission bandwidth (namely, the time of completion of preceding data transmission), both of which are directed to data transmission now under execution, the actual transmission rate received by the data transmission rate receiving element 25 and the amount of data to be transmitted acquired by the data transmission controlling information acquisition element 8.

Figure 13:
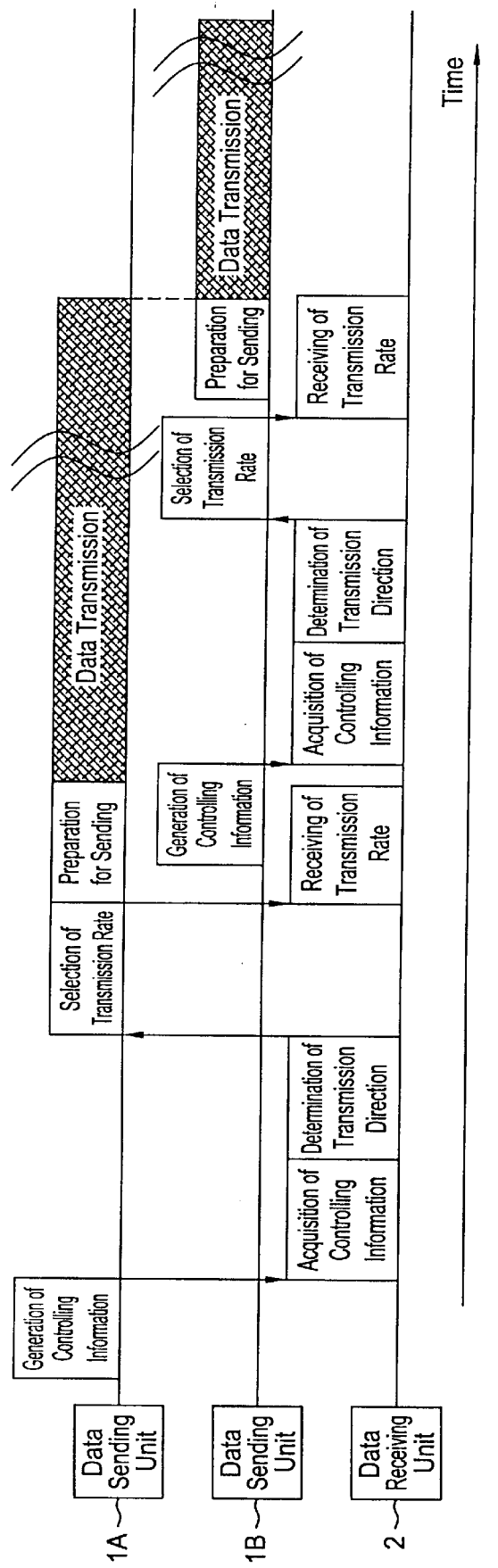
FIG. 13 illustrates an example of operations of the fourth embodiment of the system of data transmission according to the present invention.

FIG. 13 is a flow chart showing operations in the case where data transmission is switched, more specifically, the case where sending of data by the data sending unit 1A is completed and the data sending unit 1B starts sending of the data in place of the data sending unit 1A. In FIG. 13, the data receiving unit 2 notifies a direction for transmission to the data sending unit 1B before the data sending unit 1A completes its data sending. The data sending unit 1B selects a practicable transmission bandwidth within a range permitted by the direction for transmission, and notifies it to the receiving unit 2. In accordance therewith, the data receiving unit 2 accurately calculates the time period required for data transmission. The data sending unit 1B starts preparation for sending at a time preceding the completion of sending by the data sending unit 1A by the time required for preparation for sending. Thereby the data sending unit 1B is able to start data sending immediately after the data sending by the data sending unit 1A is completed.

Figure 14:
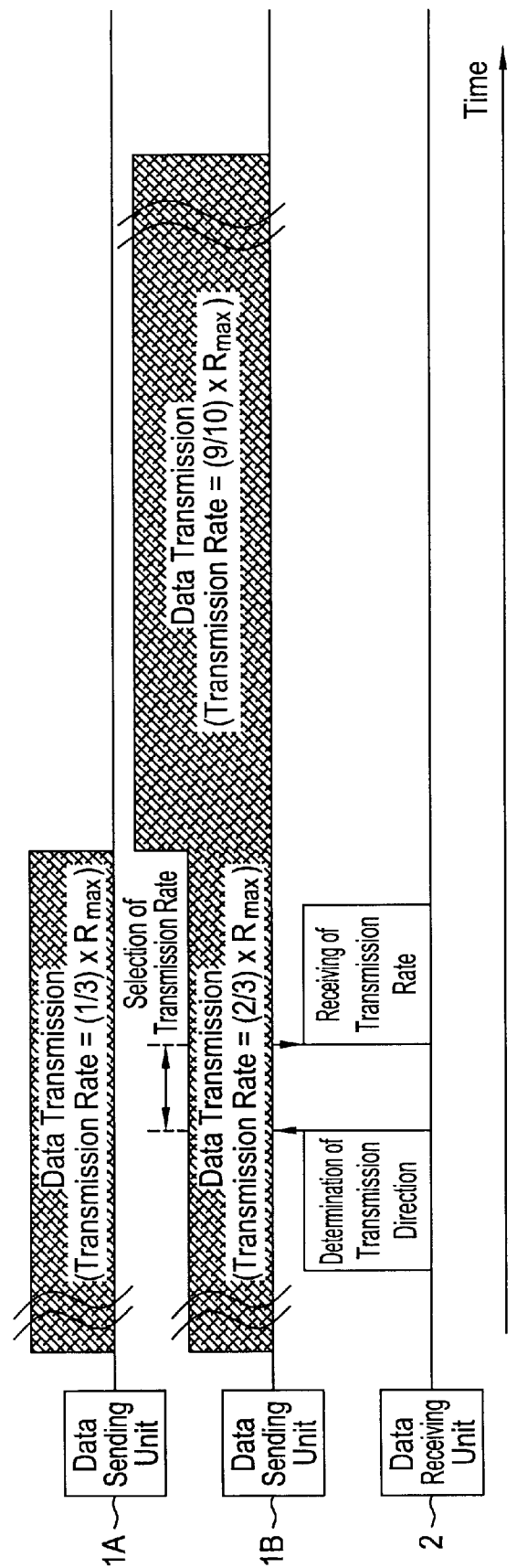
FIG. 14 illustrates another example of operations of the fourth embodiment of the system of data transmission according to the present invention.

FIG. 14 is a flow chart showing operations in the case of changing of transmission rate. It is assumed that the data sending unit 1A completes its data sending, and in accordance therewith, the transmission rate for data transmission by the data sending unit 1B is changed. In this case, also, the data receiving unit 2 sends the direction for transmission in advance for making the data sending unit 1B start preparation for changing transmission rate so that the transmission rate is increased at the time when data sending by the data sending unit 1A is completed. The data sending unit 1B selects a practicable bandwidth and increases the transmission rate to the value of the selected bandwidth. Thus the transmission rate for data transmission by the data sending unit 1B is increased immediately after sending of data by the data sending unit 1A is completed, whereby the efficiency of use of the bandwidth is improved. The data receiving unit 2 is notified of the transmission rate actually selected by the data sending unit 1B, and in accordance therewith, enabled to calculate the time required for data sending accurately.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data transmission system having a data sending unit, a data receiving unit and a data transmission medium for data transmission from the data sending unit to the data receiving unit, comprising:

means for generating feature information of data transmission from the data sending unit to the data receiving unit in advance of execution of the data transmission;

means for storing change of states of use of a bandwidth by data transmission now under execution;

means for predicting a time of completion of the data transmission now under execution based on the change of states of use of the bandwidth and the feature information of the data transmission now under execution;

means for determining a transmission rate for data transmission to be next executed at the time of completion of the data transmission now under execution based on the change of states of use of the bandwidth and the feature information of the data transmission to be next executed; and means for executing the data transmission to be next executed from the data sending unit according to the transmission rate at the time of completion of the data transmission now under execution.

2. A data transmission system having a data sending unit, a data receiving unit and a data transmission medium for data transmission from the data sending unit to the data receiving unit, comprising:

means for generating feature information of data transmission from the data sending unit to the data receiving unit in advance of execution of the data transmission;

means for storing change of states of use of a bandwidth by data transmission now under execution;

means for predicting a time of completion of the data transmission now under execution based on the change of states of use of the bandwidth and the feature information of the data transmission now under execution;

means for determining a transmission rate for data transmission to be next executed at the time of completion of the data transmission now under execution based on the change of states of use of the bandwidth and the feature information of the data transmission to be next executed;

means for calculating a time in advance of the time of completion of the data transmission now under execution by a required period of time from a time of directing data transmission according to the transmission rate determined to the data sending unit to a time of actual sending of data to the transmission medium according to the transmission rate determined; and means for executing the data transmission to be next executed from the data sending unit according to the transmission rate at the time calculated.

3. A data transmission system having a data sending unit, a data receiving unit and a data transmission medium for data transmission from the data sending unit to the data receiving unit, comprising:

means for generating feature information of data transmission from the data sending unit to the data receiving unit in advance of execution of the data transmission;

means for storing change of states of use of a bandwidth by data transmission now under execution;

means for obtaining a transmission error rate in the transmission medium;

means for calculating a time required for re-transmission caused by the transmission error in the data transmission now under execution based on the transmission error rate and the feature information of the data transmission now under execution;

means for predicting a time of completion of the data transmission now under execution based on the change of states of use of the bandwidth, the feature information of the data transmission now under execution and the time required for re-transmission;

means for determining a transmission rate for data transmission to be next executed at the time of completion of the data transmission now under execution based on the change of states of use of the bandwidth and the feature information of the data transmission to be next executed; and means for executing the data transmission to be next executed from the data sending unit according to the transmission rate at the time predicted.

4. A data transmission system having a data sending unit, a data receiving unit and a data transmission medium for data transmission from the data sending unit to the data receiving unit, comprising:

means for generating feature information of data transmission from the data sending unit to the data receiving unit in advance of execution of the data transmission;

means for determining a transmission rate practicable by the data sending unit for data transmission within a range of the transmission bandwidth permitted by the feature information of the data transmission;

means for storing the change of states of use of the bandwidth by data transmission now under execution;

means for predicting a time of completion of the data transmission now under execution based on the change of states of use of the bandwidth, the feature information of the data transmission now under execution and the practicable transmission rate;

means for determining a transmission rate permitted by the feature information of data transmission to be next executed at the time predicted based on the change of states of use of the bandwidth and the feature information of the data transmission to be next executed; and means for executing the data transmission to be next executed from the data sending unit according to the practicable transmission rate at the time predicted.

5. A data transmission method for transmitting data from a data sending unit to a data receiving unit through a data transmission medium, comprising the steps of:

a step of generating feature information of data transmission from the data sending unit to the data receiving unit in advance of execution of the data transmission;

a step of storing change of states of use of a bandwidth by data transmission now under execution;

a step of predicting a time of completion of the data transmission now under execution based on the change of states of use of the bandwidth and the feature information of the data transmission now under execution;

a step of determining a transmission rate for data transmission to be next executed at the time predicted based on the change of states of use of the bandwidth and the feature information of the data transmission to be next executed; and a step of executing the data transmission to be next executed from the data sending unit according to the transmission rate determined at the time predicted.

* * * * *